DOOR LATCHING MECHANISM

Original Filed Sept. 30, 1955 2 Sheets-Sheet 1

INVENTOR.
Bert A. Quinn
BY
Merchant & Merchant
ATTORNEYS

DOOR LATCHING MECHANISM

Original Filed Sept. 30, 1955 2 Sheets-Sheet 2

INVENTOR.
Bert A. Quinn
BY
Merchant & Merchant
ATTORNEYS

United States Patent Office

Re. 24,426
Reissued Feb. 4, 1958

24,426

DOOR LATCHING MECHANISM

Bert A. Quinn, St. Paul, Minn.

Original No. 2,796,272, dated June 18, 1957, Serial No. 537,789, September 30, 1955. Application for reissue July 29, 1957, Serial No. 675,519

4 Claims. (Cl. 292—67)

Matter enclosed in heavy brackets [ ] appears in the original patent but forms no part of this reissue specification; matter printed in italics indicates the additions made by reissue.

My invention relates generally to door latching mechanism and more particularly to latching mechanism for use on rotary type door handles.

The primary object of my invention is the provision of a latch element which is mounted for linear sliding movements on a rotary hand grip transversely thereof, and in which said latch element rotates with said hand grip on a horizontal axis to move said latch element into and out of coaction with a strike mounted on the frame on which the door is mounted.

A still further object of my invention is the provision of a device of the class above described in which the latching element is in the nature of a U-shaped latch bolt, the opposite sides of which are mounted in guideways on opposite sides of an axially extended portion of said hand grip, the closed end of said U-shaped latch bolt defining a latching surface, which is substantially flat and parallel to the direction of linear movement of said latch element.

A further object of my invention is the provision of a device immediately above described in which the opposite sides of said U-shaped latch bolt are provided with inturned opposed stop lugs which engage stop shoulders formed on opposite sides of said hand grip in said guideways, whereby to limit outward sliding movements of the latch bolt in the direction of the strike.

A still further object of my invention is the provision of a device of the class described, which is inexpensive to produce, which has a minimum of working parts, and which is extremely rugged and durable.

The above and still further objects of my invention will become apparent from the following detailed specification, claims and attached drawings.

Referring to the drawings, wherein like characters indicate like parts throughout the several views.

Figure 2:
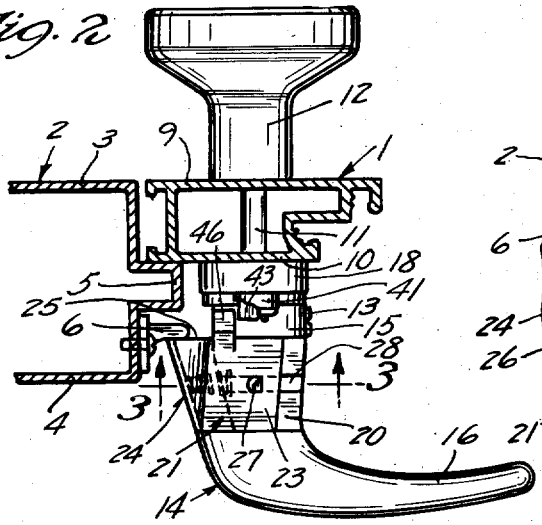
Fig. 2 is a view, partly in plan and partly in horizontal section, of the structure of Fig. 1.

Referring with greater particularity to the drawings, the numeral 1 indicates the stile of a conventional door formed from extruded metal, such as aluminum, and which is mounted by hinge means, not shown, for swinging movements towards and away from a conventional door frame 2. Door frame 2 is likewise formed from extruded aluminum and the like and is provided intermediate its outer wall 3 and its inner wall 4 with a door stop in the nature of a channel-shaped rib 5. Also secured to the door frame 2 inwardly of the stop member 5 is a strike element 6.

Projecting through aligned openings 7 and 8 in the outer and inner walls 9 and 10, respectively, of the door 1, and mounted for rotation therein on a horizontal axis normal to the plane of said door 1, is a spindle 11 to the outer end of which is secured fast a knob 12. Secured to the inner end of shaft 11 by means of a set screw or the like 13 is a hand grip 14, which comprises an axially extended portion 15 and a radially extended portion 16. Interposed between the axially extended portion 15 of the hand grip 14 and the inner wall 10 of the door 1 is a mounting plate 17, which preferably, and as shown, includes a peripheral flange 18 in direct contact with the inner wall 10 and spacing the plate 17 therefrom so as to permit vertical sliding movement of a locking tongue 19, as will hereinafter be explained in greater detail.

Hand grip 14 is formed from suitable cast metal, such as aluminum, and is formed to provide guideways 20 on its opposite side portions. As shown particularly in Fig. 2, guideways 20 extend transversely thereof and the axis of the spindle 11. A latch element, as shown in the nature of a U-shaped latch bolt 21, has its opposite side portions 22 and 23 slidably received in the guideways 20. The closed portion of the U-shaped latch bolt 21 is formed to provide the inclined cam-acting surface 24 and a relatively flat latching surface 25 which, and as shown particularly in Fig. 2, is parallel to the direction of linear movements of latch bolt 21.

Figure 3:
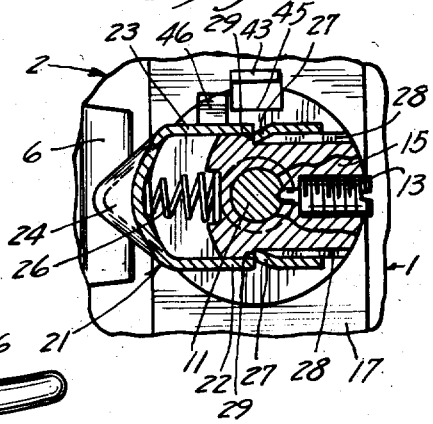
Fig. 3 is an enlarged section taken substantially on the line 3—3 of Fig. 2.

A coil compression spring 26 is interposed between the cam-acting portion 24 of the latch bolt 21 and the adjacent side of the axially extended portion 15 of the hand grip 14, as shown particularly in Fig. 3. Spring 26 biases the latch bolt 21 toward engagement thereof with the strike 6, as shown particularly in Figs. 1, 2 and 3. For the purpose of limiting outward sliding movements of the latch bolt 21 with respect to the guideways 20, the side portions, 22 and 23 are formed to provide inturned opposed stop lugs 27, which are slidably contained within opposed channels 28 within the guideways 20, the inner ends of said channels defining stop shoulders 29, each engageable with its respective stop lug 27.

Figure 5:
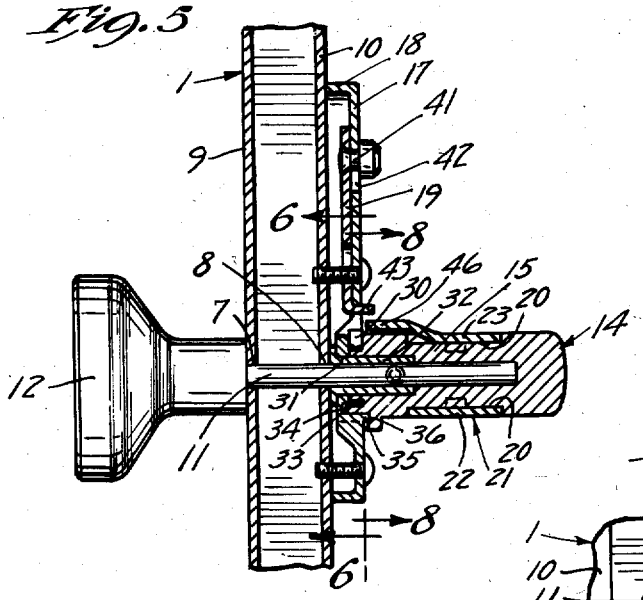
Fig. 5 is a vertical section taken substantially on the line 5—5 of Fig. 1.
Figure 7:
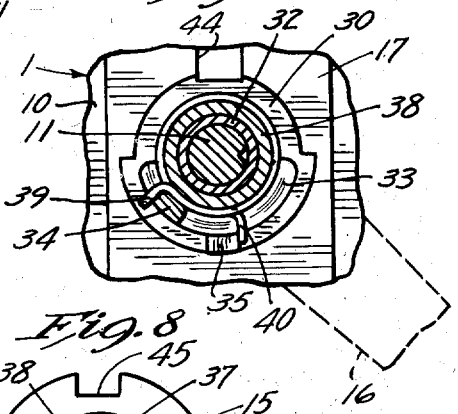
Fig. 7 is a view corresponding to Fig. 6 but showing a different position of some of the parts.
Figure 6:
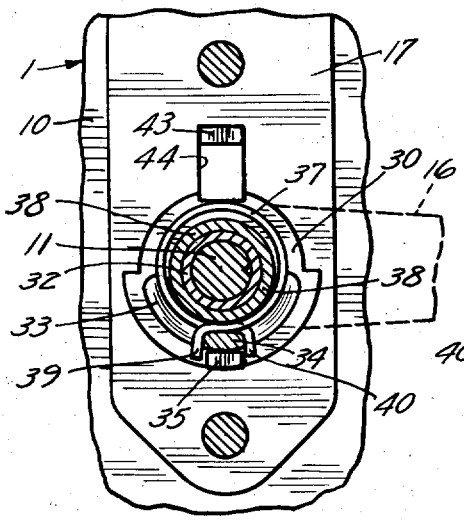
Fig. 6 is an enlarged vertical section taken substantially on the line 6—6 of Fig. 5.
Figure 8:
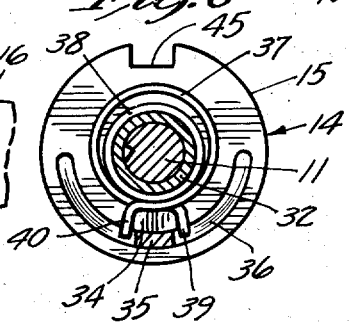
Fig. 8 is a fragmentary view in vertical section taken substantially on the line 8—8 of Fig. 5, some parts being removed.

With reference particularly to Fig. 5, it will be seen that the plate-like mounting frame 17 defines an axially outwardly opening recess 30 having a central opening 31 therein, which rotatably receives the axially extended portion of a flanged sleeve 32. With reference to Figs. 3 and 5, it will be seen that the sleeve 32 encompasses the spindle 11 and that the set screw 13 locks the spindle 11, sleeve 32 and axially extended portion 15 of the hand grip together. The flanged portion of the sleeve 32 forms a spacer between the adjacent portion of the mounting plate 17 and the inner wall 10 of the door. With reference to Figs. 6 and 7, it will be seen that a segmental slot 33 is formed in the bottom of the recess 30 and that the axially extended portion 15 of the hand grip 14 is formed to provide an axially extended finger 34, which is received in the slot 33 for limited circumferential movements therein. Radially outwardly of the segmental slot 33 within the recess 30 and projecting outwardly beyond the plane of the outer surface of the mounting plate 17 is a rib or finger 35 that is integrally formed with the mounting plate 17 and that is received in an axially opening circumferentially extended slot or groove 36 formed in the adjacent inner end of the portion 15 of the hand grip 14. A torsion spring 37 is contained within the recess 30, encompassing an axially extending annular end portion 38 of the axial portion 15 of the hand grip 14, and is provided with radially outwardly projecting ends 39 and 40 disposed on opposite sides of the finger 34 and of the rib 35, see Figs. 6–8. The disposition of the finger 34 and rib 35 with respect to the mounting plate and hand grip, respectively, is such that the extended ends of the torsion spring 37 maintain the hand grip 14 in its normal position shown in full lines in Fig. 1. Rotation of the hand grip 14 about the axis of the spindle 11 causes the finger 34 to move one of the radially projecting ends 39 or 40 circumferentially away from the other thereof, which is held against circumferential movement by engagement with the adjacent side of the rib 35. Release of the hand grip by the operator permits the yielding bias of the spring 37 to move the same to its full line position of Fig. 1.

Figure 1:
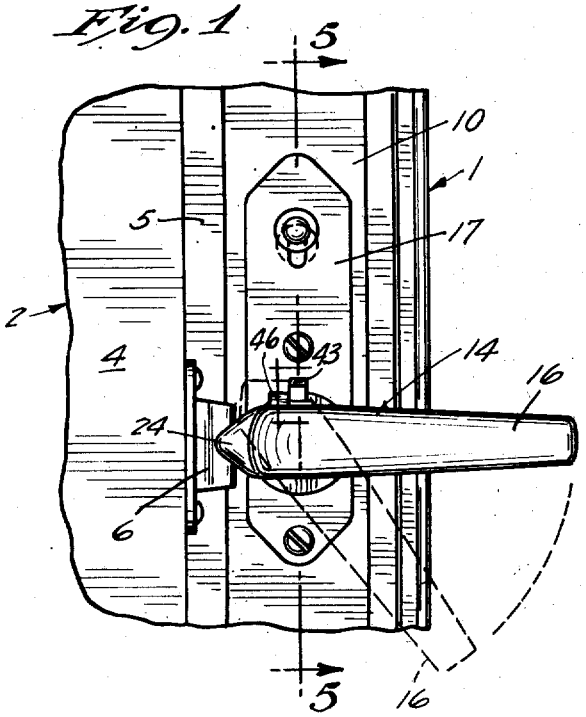
Fig. 1 is a fragmentary view of a door and door frame showing my novel structure in side elevation secured thereto.
Figure 4:
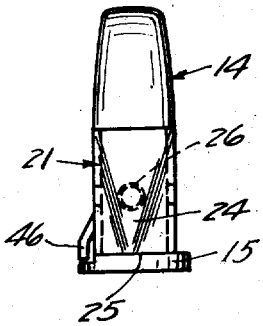
Fig. 4 is an end elevation of the hand grip and latch portion of my invention.

It will be noted, with reference to Fig. 1, that when the hand grip 14 is in its full line position, the latch bolt 21 is normally in its operative latching position with respect to the strike 6, and that rotary movement of the hand grip 14 in either direction from its full line position of Fig. 1, such as, for instance, to its dotted line position of Fig. 1, will move the latch bolt end portion 24 out of registration with the strike 6 to permit opening movements to be imparted to the door 1. It should be noted that the hand grip 14 or the knob 12 need not be rotated away from their normal positions to permit closing and latching of the door, due to the mounting of the latch bolt 21 and the cam-acting end portion 24 of the latch bolt.

The locking tongue 19 is provided at one end portion with a retaining pin 41, which extends outwardly through a slot 42 in the mounting plate 17, and at its other end with an outwardly extending lug 43, which projects outwardly through a slot or notch 44 in the mounting plate 17, which slot extends longitudinally of the mounting plate 17 from the recess 30 therein. The adjacent side of the axially extended portion 15 of the hand grip 14 is provided with a radially outwardly opening notch 45, which is adapted to receive the lug 43 of the locking tongue upon movement of said tongue in one direction. With reference to Figs. 1–3, it will be noted that the side portion 23 of the latch bolt 21 is formed to provide an axially extending finger 46, which is normally disposed between the path of movement of the lug 43 and the plane of the adjacent edge of the door 1. When the locking tongue 19 is moved to its locking position, the lug 43 extends outwardly through the notch 45 and is disposed in the path of travel of the finger 46 in a latch bolt retracting direction. Thus, when the locking tongue 19 is moved to its operative locking position, the lug 43 positively locks the hand grip 14 against rotation in either direction, and prevents transverse sliding movement of the latch bolt 21 in a retracting direction away from the strike 6. With this arrangement, the door 1 cannot be opened from the outside, even in the event that a tool could be inserted therebetween and the door frame 2 with the intention of moving the latch bolt 21 in a direction to disengage the same from the strike 6. Thus, the locking tongue 19 performs a dual locking function in a simple and efficient manner.

My invention has been thoroughly tested and found to be completely satisfactory for the accomplishment of the objectives set forth, and while I have shown and described a preferred embodiment of my novel lock, it will be understood that same is capable of modification without departure from the spirit and scope of the invention as defined in the claims.

What I claim is:

1. In a lock of the class described, a mounting plate adapted to be secured to a door, a rotary hand grip, means mounting said hand grip on said mounting plate for rotation on a horizontal axis perpendicular to said door, said hand grip including an axially extended portion adjacent said mounting plate and a generally radially extended portion in spaced relation to said mounting plate, said axially extended portion defining a guideway, a cross sectionally U-shaped latch bolt mounted in said guideway for linear movements therein transversely of said axially extended portion, said latch bolt having a latching surface at one end thereof [,] adapted to engage a strike on the frame on which the door is mounted, a spring yieldingly urging said latch bolt in a direction of its linear movement toward latching engagement with said strike when said lock is mounted on the door, said axially extended portion defining a stop shoulder, and an inturned ear on said latch bolt engaging said stop shoulder to limit movement of said latch bolt in a strike-engaging direction, said latch bolt rotating with said hand grip on said horizontal axis, whereby to be moved into and out of engagement with said strike.

2. The structure defined in claim 1 in which the axially extended portion of said hand grip defines a radially outwardly opening recess, and in which said latch bolt includes an axially extended finger normally positioned between said recess and the strike-engaging portion of said latch bolt, and in further combination with a locking lug element mounted on said mounting plate for movements toward and away from an operative position wherein said lug element is received in said recess to prevent rotary movement of said hand grip, and wherein said lug element is disposed in the path of travel of said latch bolt finger in a direction away from said latch bolt operative strike-engaging position to positively limit unlatching linear movement of said latch bolt.

*3. In a lock of the class described, a mounting plate adapted to be secured to a door, a rotary hand grip, means mounting said hand grip on said mounting plate for rotation on a horizontal axis perpendicular to said door, said hand grip including an axially extended portion adjacent said mounting plate and a generally radially extended portion in spaced relation to said mounting plate, opposite sides of said axially extended portion defining a guideway, a cross sectionally U-shaped latch bolt mounted in said guideway for linear movements therein transversely of said axially extended portion, said latch bolt having a latching surface at one end thereof adapted to engage a strike on the frame on which the door is mounted, a spring yieldingly urging said latch bolt in a direction of its linear movement toward latching engagement with said strike when said lock is mounted on the door, and means carried by opposite sides of said U-shaped latch bolt and engageable with said axially extended portion and positively limiting movements of said latch bolt in the direction imparted thereto by said spring, said latch bolt rotating with said hand grip on said horizotnal axis, whereby to be moved into and out of engagement with said strike.*

*4. The structure defined in claim 3 in which the axially extended portion of said hand grip defines a radially outwardly opening recess and said latch bolt includes an axially extended finger normally positioned between said recess and the strike-engaging portion of said latch bolt, and in further combination with a locking lug element mounted on said mounting plate for movements toward and away from an operative position wherein said lug element is received in said recess to prevent rotary movement of said hand grip, and wherein said lug element is disposed in the path of travel of said latch bolt finger in a direction away from said latch bolt operative strike-engaging position to positively limit said unlatching linear movement of said latch bolt.*

References Cited in the file of this patent or the original patent

UNITED STATES PATENTS

| | | |
|---|---|---|
| 2,435,180 | Ledin | Jan. 27, 1948 |
| 2,442,041 | Gerson | May 25, 1948 |
| 2,707,121 | Behnke | Apr. 26, 1955 |
| 2,727,773 | Hagstrom | Dec. 20, 1955 |
| 2,733,089 | Grevengoed | Jan. 31, 1956 |